Dec. 4, 1934.   S. SEILER   1,983,195
STEERING WHEEL
Filed July 31, 1934   2 Sheets-Sheet 1

Inventor,
Sam Seiler
By A. Yates Dowell
Atty.

Dec. 4, 1934.  S. SEILER  1,983,195
STEERING WHEEL
Filed July 31, 1934  2 Sheets-Sheet 2
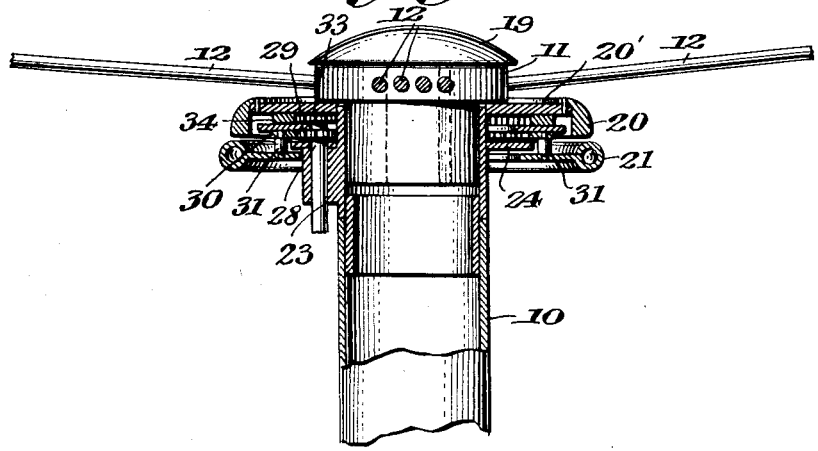
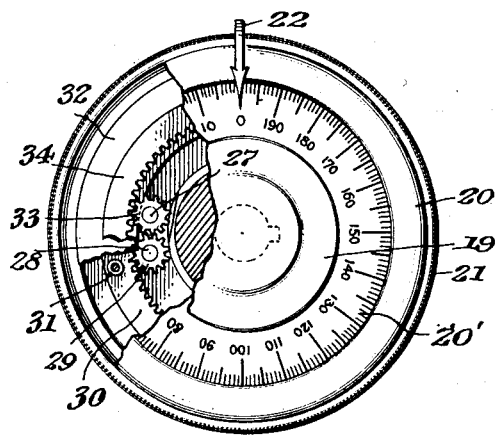
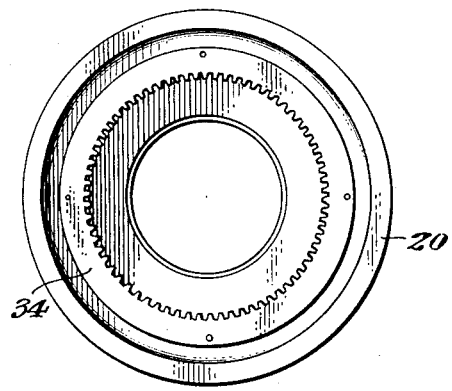
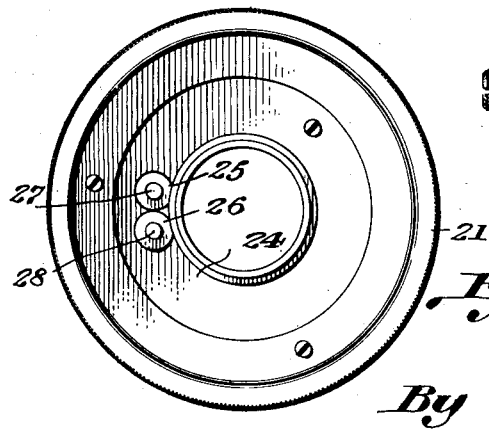
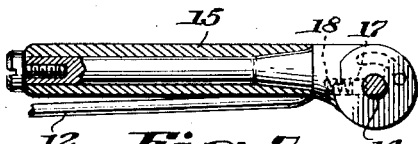

Patented Dec. 4, 1934

1,983,195

UNITED STATES PATENT OFFICE 1,983,195

STEERING WHEEL

Sam Seiler, Clermont, Fla.

Application July 31, 1934, Serial No. 737,861

9 Claims. (Cl. 74—557)

This invention relates to a combination steering wheel and means associated therewith for controlling a remotely positioned radio.

Among the objects of the invention is to provide an improved steering wheel and an associated radio control capable of being manipulated with ease without removing the hand from the steering wheel.

Another object of the invention is to provide a steering wheel having the advantages of the modern type of steering wheel and also having the advantages of the old, out of date, crank type steering mechanism with the upstanding handle or grip, the combination of which two types permit the wheel to be operated in the usual manner, or by means of the upstanding handle or grip for signalling or other desired purposes.

A further object of the invention is to provide a steering wheel affording clearer vision through the same, and of a flexible character which will absorb shock between the steering post and the rim or portion gripped by the hand of the operator.

Figure 1:
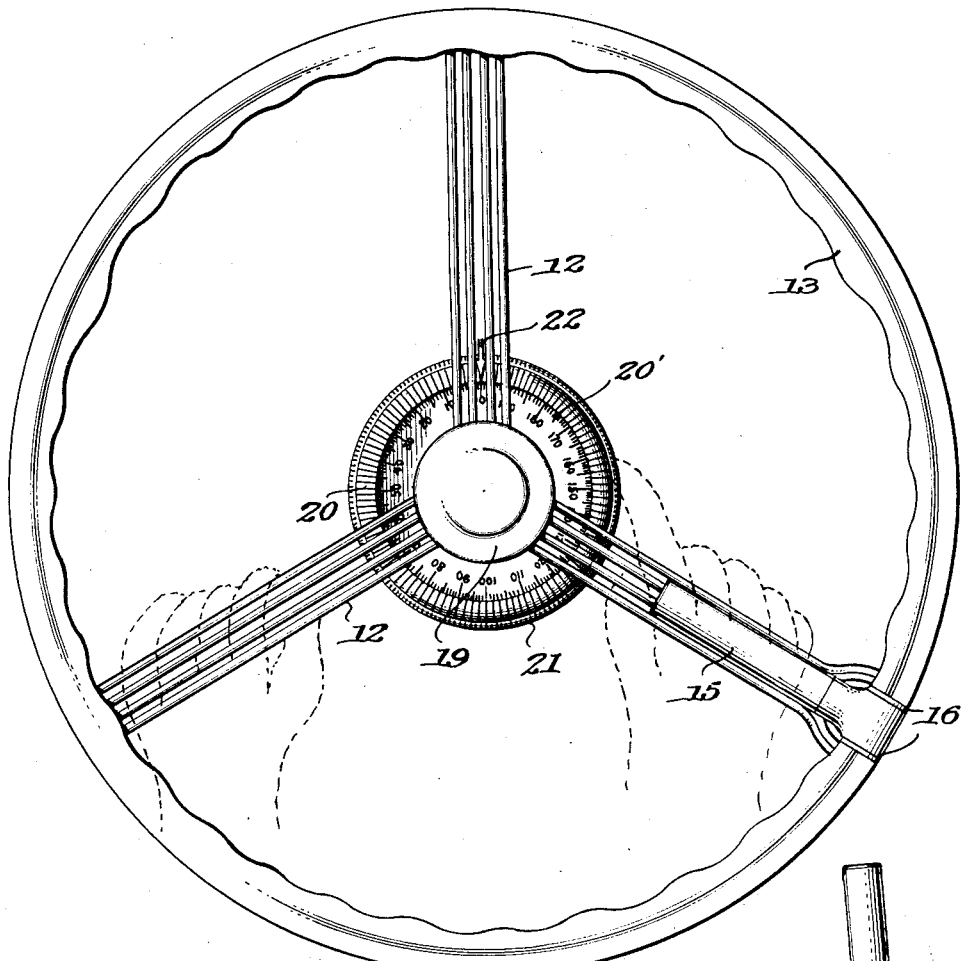
Figure 2:
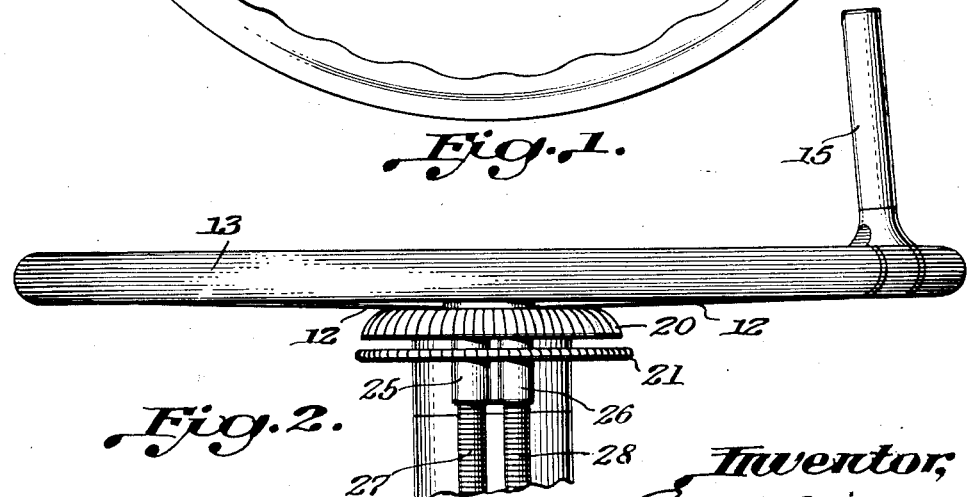

Further objects and advantages of the invention will be apparent from the following description taken in conjunction with the accompanying drawings, wherein:

Fig. 1 is a top plan view of a steering wheel and radio control illustrating how my invention may be applied;

Fig. 2, a side elevation of the structure of Fig. 1 with an operating handle or grip upraised in a position to be gripped by the hand;

Fig. 3, an upright fragmentary section;

Fig. 4, a detail plan of the control with portions broken away to disclose the inner construction;

Fig. 5, a bottom plan of the top or station-selecting member;

Fig. 6, a bottom plan view of the control; and

Fig. 7, a detail of the handle showing the manner in which it is held in a definite position.

Referring to the drawings, at the upper end of the steering column 10 is mounted a steering wheel in the form of a hub 11, spokes 12 and rim 13. The rim 13 is formed of a circular core or annular metal ring 14, (see Fig. 7) and is covered with the conventional rubber composition. As shown, the wheel is provided with three groups of spokes, each group consisting of four spokes.

A handle 15 is pivoted on the ring 14 in a manner to be disposed in an extended or upright position, substantially at right angles to the plane of the wheel, as shown in Fig. 2, or disposed in a collapsed position in snug engagement with the spokes as shown in Fig. 1. In the first-named, or extended, position the handle 15 may be grasped by the hand to afford easier means for rotating or controlling the wheel, while in its other or collapsed position it may offer no obstruction to the operation of the wheel in the ordinary manner.

The handle 15 is mounted at the outer ends of one group of spokes and the spokes are arranged to provide depressions, as shown, in order to permit the handle to fit snugly in place.

The base of the handle 15 is pivoted upon the rim of the wheel and is disposed between a pair of bearing washers 16. These bearing washers and the base of the handle are of a size corresponding to the size of the overall diameter of the rim of the wheel thus permitting the hand of the operator to be moved along the rim of the wheel without encountering any obstruction or difficulty.

In order to maintain the handle 15 in its collapsed position or in its upright position any desired means may be employed, as for example, a detent 17 urged against the flattened side of the ring 14 by means of a spring 18. Over the hub 12 of the wheel is disposed a conventional horn button 19.

From the above it will be readily apparent that I have provided a steering wheel of simple construction, having sufficient resiliency to absorb shock and at the same time having an additional advantage in the provision of an auxiliary handle by means of which the wheel may be controlled when desired.

The small spokes 12 besides being attractive in appearance, do not obstruct the vision of the instrument board or the like beneath the wheel, and as shown, there is provided about the hub of the wheel a control for radio located at a remote point. This control is very close to the spokes of the steering wheel and permits manipulation by the thum and forefinger while the spokes of the wheel are grasped by the other three fingers.

As shown, the radio control comprises a pair of rotatable discs 20 and 21, the disc 20 being connected to control the selection of stations and having a dial 20' with suitable numbers thereon and the disc 21 being connected to control the volume. A stationary pointer 22 overlies the dial 20'.

In order to connect the manipulating discs 20 and 21 with the radio a sleeve 23 is provided having an outwardly extending flange 24 and bosses 25 and 26, in which are rotatably mounted spindles or cables 27 and 28. The spindle 27 is provided with a gear 29 on its upper end, which fits snugly against the flange 24 and is engaged by a toothed hollow gear ring 30 held in spaced relation to the operating disc 21 by means of spacing elements 31. On top of this hollow gear ring is mounted a flat ring 32 which is of slightly smaller diameter so that it rests upon the gear 29 and maintains the gear and its ring in proper relation so that when the ring is turned the gear and the spindle will be likewise rotated.

Above the flat ring 32 on the upper end of the spindle 28 is mounted another gear 33, the under side of which rests upon the ring 32. On the under side of the operating disc 20 and the scale disc carried thereby, is a disc 35 which forms a bearing for the upper end of the gear 33, and beneath this disc is a hollow gear ring 34 which serves to space this disc from the disc 32 so that the gear 33 is properly engaged with its gear ring. Thus when the disc 20 is rotated, the gear 33 will be rotated and will rotate the spindle connected to the radio.

I claim:—

1. A steering wheel comprising a hub and a rim, spokes connecting the hub and rim, and a handle pivoted upon said rim whereby said handle may be collapsed within the plane of the rim, the pivotal portion of the handle being of the same diameter as the rim whereby a smooth rim surface is presented when the handle is collapsed.

2. A steering wheel comprising a hub and a rim, spokes connecting the hub and rim, and a handle pivoted upon said rim whereby said handle may be collapsed within the plane of the rim, the pivotal portion of the handle being of the same diameter as the rim whereby a smooth rim surface is presented when the handle is collapsed and detent means to hold said handle in a definite position.

3. A steering wheel comprising a hub and a rim, spokes connecting the hub and rim, and a handle pivoted upon said rim whereby said handle may be collapsed within the plane of the rim, the pivotal portion of the handle being of the same diameter as the rim whereby a smooth rim surface is presented when the handle is collapsed, said spokes being of a character to permit vision therethrough.

4. In combination, a steering wheel and a radio control member, a steering column supporting said wheel and control member, said radio control member comprising nested control members mounted concentrically of the steering column directly beneath said wheel.

5. In combination, a steering wheel, a steering column supporting said wheel and radio-control ring-shaped members swivelled directly beneath said steering wheel concentrically of the steering column.

6. In combination, a steering wheel and a radio control member, a steering column supporting said wheel and control member, said radio control member comprising nested control members mounted concentrically of the steering column directly beneath said wheel and a handle pivoted upon said wheel in a manner to be disposed within the plane of the wheel or extending outwardly from such plane to provide means by which the wheel may be operated.

7. A steering wheel comprising a hub and rim, spokes connecting the hub and rim, and a handle pivoted upon said rim and capable of being disposed in a position where it may be grasped for controlling the wheel and being collapsible to lie substantially within the plane of the wheel flat on one of the spokes, said spoke being constructed to conform to the handle in a manner to provide an enlarged grip, the pivoted portion of the handle being of a size corresponding to the size of said rim.

8. A steering wheel comprising a hub and rim, spokes connecting the hub and rim, and a handle pivoted upon said rim and capable of being disposed in a position where it may be grasped for controlling the wheel and being collapsible to lie substantially within the plane of the wheel flat on one of the spokes, said spoke being constructed to conform to the handle in a manner to provide an enlarged grip, the pivoted portion of the handle being of a size corresponding to the size of said rim and said spokes being constructed to permit vision therethrough.

9. In combination, a steering wheel for a vehicle and a control for a radio associated with said vehicle, a steering column supporting said steering wheel and said radio control, said radio control being disposed beneath the steering wheel in a manner to be manipulated without removing the hand from the wheel, said wheel comprising a hub and a rim and spokes connecting the hub and rim, said spokes each being formed of a plurality of members connecting the hub and rim and each of the connecting members being relatively small in cross section and said connecting members being spaced apart in each group and affording substantially unobstructed vision through the spoke, said radio control being mounted concentrically of the steering column and accessible laterally of the steering column in any position, said control further comprising a pair of concentric disks having their circumferences disposed in proximity each to the other and closely adjacent the wheel, and a handle pivoted upon the end of the wheel and mounted to be disposed in a position extending upwardly from the wheel or substantially in the plane of the wheel whereby said handle can be grasped for steering or when in its collapsed position will not interfere with manipulation of the wheel in the conventional manner.

SAM SEILER.